(12) United States Patent
Weiland et al.

(10) Patent No.: US 6,522,876 B1
(45) Date of Patent: Feb. 18, 2003

(54) SYSTEM FOR MANAGING TELECOMMUNICATIONS SERVICES THROUGH USE OF CUSTOMIZED PROFILE MANAGEMENT CODES

(75) Inventors: Dorene G. Weiland, Lake Lotawana, MO (US); Von K. McConnell, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/411,885

(22) Filed: Oct. 4, 1999

(51) Int. Cl.[7] ................................................. H04Q 7/00
(52) U.S. Cl. ...................................... 455/414; 455/422
(58) Field of Search ..................... 379/201.01, 201.02, 379/201.05, 204.01, 207.02, 207.03, 207.11, 207.13, 207.15; 455/414, 415, 417, 419, 422

(56) References Cited

U.S. PATENT DOCUMENTS

| | | | |
|---|---|---|---|
| 5,386,467 A | * 1/1995 | Ahmad | 379/220 |
| 5,539,806 A | * 7/1996 | Allen et al. | 379/52 |
| 5,898,917 A | 4/1999 | Batni et al. | 455/564 |
| 5,920,820 A | 7/1999 | Qureshi et al. | 455/461 |
| 6,003,031 A | * 12/1999 | Hartikainen et al. | 707/10 |

* cited by examiner

Primary Examiner—Thanh Cong Le
Assistant Examiner—Tsuleun Lei
(74) Attorney, Agent, or Firm—Harley R. Ball; Steven J. Funk; Kevin D. Robb (57) ABSTRACT

A service management system based on customized profile management codes. In an advanced intelligent network, a central control point includes a set of logic that defines profile management codes customized for individual subscribers or groups of subscribers. When the central control point receives a profile management code for a particular subscriber, for instance, the central control point may interpret the profile management code altogether differently than it does for the same code from another subscriber. For instance, the logic in a single central control point may indicate for one subscriber that the code "11" means to "activate call forwarding," and the logic may indicate for another subscriber that the code "11" means to "bill the call to a specified third party account."

31 Claims, 6 Drawing Sheets

TEMPLATE 1

| BILLING | |
|---|---|
| DAY/TIME | BILL TO |
| WEEKDAYS | WORK # |
| WEEKENDS | HOME # |

TEMPLATE 2

| ABBR. DIALING | |
|---|---|
| DIALED | FULL # |
| 1234 | 333-4567 |
| 1111 | 867-1153 |
| 9888 | 222-1212 |

TEMPLATE 3

| FORWARDING |
|---|
| ON = 1 / OFF = 0 |
| 0 |

TEMPLATE 4

| FORWARD TO | |
|---|---|
| DATE/TIME | FORWARD TO |
| JAN-AUG | 559-1000 |
| SEPT-DEC | 201-1234 |

TEMPLATE 5

| | PROFILE-MANAGEMENT CODES | |
|---|---|---|
| | CODE | ACTION |
| a | 11 | CHANGE TEMPLATE 1 LINE b BILL-TO TO WORK # |
| b | *5 | TOGGLE CALL-FORWARDING |
| c | 678 | SEND SMS MESSAGE TO MOBILE STATION X |
| d | #11, 22 | CHANGE TEMPLATE 5 LINE a CODE TO 22 |

SYSTEM FOR MANAGING TELECOMMUNICATIONS SERVICES THROUGH USE OF CUSTOMIZED PROFILE MANAGEMENT CODES

BACKGROUND OF THE INVENTION

1. Field of the Invention

The present invention relates to telecommunications services and more particularly to a method and system for using customized profile management codes to manage subscriber services.

2. Description of Related Art

Recent advances in telecommunications systems have enabled a wide array of special services to be made available to subscribers. Examples of such services include abbreviated dialing, which allows a subscriber to reach a party by dialing less than the entire telephone number of that party, call forwarding, in which calls directed to the subscriber may be forwarded to another line, terminating call screening, which allows the subscriber to specify certain times during which incoming calls are to be rejected, and originating call screening, in which calls to certain telephone numbers are barred. In general, special telecommunications services ("services") encompass those call features that do more than simply place or terminate telephone calls as dialed.

In the past, special telecommunications services were governed and provided for exclusively by the network switches or other entities that routed calls from one location to another. Such switches or other entities are usually at least part of a "serving system" that provides service for a plurality of subscribers. A typical switch would include a database of control information and call processing logic in addition to its basic switching capabilities. In response to a call placed to or from a subscriber, the switch would then apply services defined by this call processing logic. For example, the service logic may indicate that all unanswered calls to a particular subscriber should be redirected to a particular voice mail server.

This approach was viewed as unwieldy, however, because a telecommunications provider needed to update the software and databases on all of its many switches in order to update services or add new services throughout its telecommunications network. And to further complicate matters, the software needed to program switches from different vendors often differed greatly.

To overcome these limitations, many telecommunications networks have now adopted an advanced intelligent network ("AIN") approach. According to the AIN approach, much of the control information and call processing logic resides in a central network location or "central control point" instead of in the multitude of switches. Each switch is then programmed with a relatively minimal set of service logic that causes the switch to query the central control point at predefined "trigger points" during call processing, providing the central control point with parameters such as an identification of the calling and called parties, for example. When the central control point receives the query message, it may execute an appropriate set of service logic and/or consult appropriate databases in order to obtain information and instructions needed to provide a special service to the call. In turn, the central control point may return a response message to the switch, instructing the switch how to handle the call.

In this way, the telecommunications switches can be quite generic but still able to carry out a variety of services. Further, changes made to service logic at the central control point can apply to a large number of switches, which makes changing or activating services and adding new services much easier and reduces the problem of differences in switches from different vendors.

An AIN network typically employs a standardized set of messages for communication between the switches (or other such entities) and the central control point, in order to allow for a variety of services. This standardized set of messages may be conveyed, for instance, over an out-of-band common channel interoffice signaling (CCIS) network, according to an established signaling protocol. The most well known such protocol is Signaling System #7 ("SS7"). According to SS7, predefined messages may be coded as Transaction Capabilities Application Part ("TCAP") messages and routed via a signaling transfer points ("STPs") between the switches and the central control point.

The particular message set may vary depending on the type of network. For instance, traditional landline AIN networks may operate according to standards are embodied in Bellcore's AIN Release 0.1 and AIN Release 0.2. Typical wireless networks, on the other hand, may operate according to other standards, such as Telecommunications Industry Association (TIA)/Electronics Industry Association (EIA) Interim Standard IS-41 ("Cellular Radiotelecommunications Intersystem Operations") and Interim Standard IS-771 ("Wireless Intelligent Network"). The entirety of each of these standards (as well as all revisions thereof) is hereby incorporated herein by reference.

In general, the trigger points and other control information about call processing for a given subscriber or group of subscribers can be defined and recorded in a database that is maintained for reference by the serving system during call processing. This set of parameters is considered a type of profile for the subscriber, or a subscriber profile. When the switch receives a request to complete a call to or from a subscriber, the switch may consult the subscriber's profile to determine whether it needs to query a central control point for call-handling instructions and/or whether it should carry out certain call processing logic itself.

By applying the AIN approach, the call processing information that is maintained locally for reference by the switch can be minimized, since most of the service logic and feature information for the subscriber can be maintained by the central control point instead. Further, changes made to service logic at the central control point can apply to a large number of switches, which makes changing or activating services and adding new services much easier and reduces the problem of differences in switches from different vendors.

A subscriber profile may define various types of trigger points and control information. At a basic level, for instance, a profile may define a so-called "all-digits trigger," which tells the serving system to query the central control point whenever the serving system receives a call origination attempt from the subscriber. Similarly, a profile may define a termination-attempt trigger, which tells the serving system to query the central control point whenever the serving system receives a request to connect a call to the subscriber. Such global triggers can be usefully employed to give the central control point extensive control over the services that will be provided to the subscriber. For instance, upon receipt of a TCAP query that is generated upon call origination, the central control point may determine that the calling subscriber has subscribed to a pre-paid call accounting service; in response, the central control point may initiate logic that will time the subscriber's call and decrement a pre-paid account balance accordingly.

The profile can define more specific triggers as well. For example, the profile may define a call origination trigger indicating that the serving system should further reference the subscriber profile to determine whether the subscriber is attempting to call a restricted destination, e.g., that the subscriber is blocked from calling a dialed number. Such a calling restriction may be desirable for group calling plans such as private branch exchange ("PBX") or Centrex service, or for parental control, for instance. If the number is blocked, standard local service logic may direct the serving system to respond with a recorded message or other appropriate action, or the trigger may indicate that the serving system should query the central control point for guidance.

As still another example, the profile may define a call termination trigger that indicates that if the called subscriber's line is busy or there is no answer, the call should be forwarded to a particular number that is recorded in subscriber's profile. Alternatively, the termination trigger may indicate that, in response to a busy or no answer condition, the switch should query the central control point for processing instructions. In that event, the central control point may apply a set of service logic for the subscriber and decide that the call should be forwarded to a specified number (e.g., to a specified voice mail system), or that the switch should operate as normal (e.g., provide a busy signal). The central control point may then instruct the switch accordingly.

The AIN concept is applicable in virtually any type of telecommunications network. Examples of such networks include, for instance, landline networks and wireless networks (e.g., cellular radio transmission networks).

In a traditional AIN arrangement, each serving system comprises a switch referred to as a service switching point ("SSP"). The SSP is coupled via an STP network to a central control point, which is referred to as a service control point ("SCP"). The SSP maintains a subscriber profile database (e.g., a table, or more generally a data template or plurality of data templates), which defines trigger points for a given subscriber or group of subscribers. The SCP, in turn, maintains a subscriber profile database as well, indicating what service logic to provide for a particular subscriber or group of subscribers. When the SSP encounters a trigger point during call processing, it generates a TCAP query message defining the subscriber and other parameters, and it sends the query to the SCP. The SCP, in turn references its subscriber profile database, and identifies and executes the appropriate set of service logic. The SCP then generates and sends to the SSP a TCAP response message providing call handling instructions (e.g., a routing instruction, an instruction to play a message to the caller, or an instruction to simply connect the call to the dialed address.) Of course other arrangements are possible as well.

In traditional wireless networks, each serving system comprises a switch often referred to as a mobile switching center ("MSC"), as well as a subscriber profile database referred to as a visitor location register ("VLR"). A mobile subscriber (mobile station) communicates over an air interface with a base station in a cell, and the base station is interconnected to the MSC, in order to provide connectivity with other points. Each mobile subscriber is registered in a home system. The home system includes a home location register ("HLR") that defines the services and features authorized for use by the subscriber. When a mobile subscriber roams into a given serving system (even the subscriber's home system), the serving system engages in signaling communication with the HLR in the subscriber's home system (i) to notify the HLR where the subscriber is located and (ii) to obtain the subscriber's current profile. The serving system then stores the profile in its VLR for reference.

In wireless, the AIN concept is also referred to as Wireless Intelligent Network ("WIN"). Generally speaking, as in traditional landline systems, a wireless network may include a central control point to assist one or more serving systems in handling calls. However, a WIN arrangement typically employs a unique message set and provides additional capabilities in order to facilitate mobility management and other functions that are uniquely associated with providing service for mobile subscribers.

In current practice, the central control point in a WIN arrangement can take any form, including but not limited to an SCP and/or an HLR. When the serving system receives a call to or from a given subscriber, the serving system consults the subscriber's profile in the VLR and determines whether to query the central control point. A trigger point in the profile may instruct the serving system to send a signaling message to one or another central control point. The signaling message is typically defined by industry standards and encapsulated in a TCAP message, and the message provides the central control point with appropriate parameters such as an identification of the subscriber. Upon receipt of the signaling message, the central control point may identify and execute a set of service logic for the subscriber and then generate and send to the serving system a response signaling message providing call handling instructions.

As an example, a serving system in a wireless network may include in the profile for a given mobile subscriber an all-digits trigger that causes the serving system to query a designated SCP in response to any digit sequence dialed by the subscriber. If the subscriber then dials an abbreviated dialing extension, the serving system would query the designated SCP for call handling instructions, the SCP may then translate the extension into a full routing number and return the full routing number to the serving system, and the serving system would route the call accordingly. As another example, a subscriber's HLR may include in the profile for the subscriber a particular termination trigger that directs the serving system to query a designated SCP for call handling instructions in response to a termination attempt to the subscriber. When the serving system receives a termination to the subscriber, the serving system may then query the HLR for instructions, the HLR may send the termination trigger to the serving system as an "advanced termination trigger" (i.e., one that does not normally reside in the serving system), and the serving system may respond to the trigger by querying the designated SCP for call handling instructions.

In addition, it is possible to arrange for the central control point in one system to communicate with the central control point in another system. For instance, one carrier's network may include an SCP (SCP-1) that provides call processing logic for calls placed to or from the network. However, another carrier's network may include an SCP (SCP-2) that contains service logic for a user who happens to be using the first carrier's network at the moment. (For instance, the second carrier may sell telecommunications services to a customer of the first carrier's). When SCP-1 receives a TCAP query from a serving system in the first's carrier's network, it may pass a signaling message to SCP-2 to find out what to do. SCP-2 may then identify and execute a set of service logic for the subscriber and then generate and return to SCP-1 a response signaling message providing call-handling instructions. SCP-1 would then send a response TCAP message to the serving system conveying the call-handling instructions, and the serving system would carry out the instructions. A mediated service logic system is disclosed, for instance, in a co-pending U.S. patent application entitled "Method and System for Providing Telecommunications Services Using Mediated Service Logic," filed on Oct. 1, 1999 by Von K. McConnell and assigned to the owner of the present invention, the entirety of which is hereby incorporated by reference.

In a typical AIN arrangement, many of the services for which a subscriber or group of subscribers is authorized can be turned on and off (i.e., activated and de-activated) or modified. For instance, a subscriber may subscribe to a call-forwarding-unconditional service, which provides that any unanswered call (whether or not the called party is busy) should be forwarded to a designated network address. The subscriber may be given the ability to turn this service on or off. Similarly, a subscriber may subscribe to a voice mail service, which directs unanswered calls to voice mail (a type of call forwarding). Again, the subscriber may be given the ability to turn this service on or off. As still another example, the subscriber may be given the ability to set and/or modify the number to which calls to the subscriber should be forwarded.

To facilitate activating, deactivating and modifying telecommunications services and providing other such functions, the industry has for many years employed a concept known as "feature codes." A service provider may define specific digit sequences for use in activating, deactivating or modifying particular service features. Each sequence is known as a feature code (or, equivalently, a feature code string). A feature code usually consists of a preceding asterisk (*) or double asterisk (**) followed by a series of numeric digits (0 through 9). Further, a pound sign (#) is sometimes used to delimit particular sequences of digits. For instance, the feature code string

*72 4085550303 could mean that a call forwarding forward-to number is being registered. In this example, *72 indicates that the call-forwarding feature is being accessed, and the digit sequence 4085550303 indicates the forward-to number.

Some feature codes may be sent as a single step to activate, deactivate or modify a service feature (such as to turn on or off call-forwarding or to change the forward-to number). Other feature codes can be applied on a per-call basis. For instance, by preceding a dialed digit sequence with a specified feature code, a subscriber may disable call-waiting for the single call. As another example, by preceding a dialed digit sequence with another specified feature code, a subscriber may activate a calling-number identification restriction for a single call.

When a subscriber (e.g., person or machine) sends a feature code string to a serving system, the serving system itself may respond to the feature code by employing logic to activate, deactivate or modify a service feature for the subscriber. Alternatively or additionally, the serving system may forward the feature code to a central control point, and the central control point may then respond to the feature code by activating, deactivating or modifying a service feature for the subscriber and then sending a response message to the serving system. Whether the feature code causes such work by the serving system or by a central control point may typically depend on the particular feature code as well as the distribution of the carrier's call processing logic between the serving system and the central control point.

Consider a traditional landline AIN arrangement for example. As indicated above, an SCP commonly contains a subscriber profile database, which defines the service logic that is to be executed per subscriber or per group of subscribers. The profile may point to service logic that defines various operations to apply for the subscriber (such as translating a dialed number into a forwarding number, for instance). Say a subscriber dials the *72 4085550303 sequence described above. In this example, when the subscriber's serving system receives this string of dialed digits, the serving system might apply a minimal set of call processing logic that includes various triggers. One of the triggers may be an all-digits trigger, or alternatively a trigger for any dialed number that begins with an asterisk. In response to this trigger, the serving system will generate and send a TCAP query to the SCP, providing as parameters an identification of the subscriber (e.g., the subscriber's calling number) and the dialed digits.

When the SCP receives this query, it will parse the message and identify the subscriber and the dialed digits. Recognizing that the dialed digits begin with the established feature code of *72, the SCP will responsively change the subscriber's profile and/or service logic to indicate that the subscriber's forward-to number is 4085550303. In turn, the SCP will send a response message to the serving system, possibly instructing the serving system to play a message to the subscriber confirming that the subscriber's forward-to number has been changed.

Alternatively, the serving system itself might apply switch-based logic to respond to the feature code and to change the forward-to number. In that event, for instance, the serving system might change data in the subscriber's profile to indicate that the subscriber's forward-to number is now 4085550303.

Feature codes should not be confused with abbreviated dialing extensions, which are also well known and have been employed for many years in the art. Originally used in PBX systems, abbreviated dialing allows an individual subscriber or group of subscribers to dial a shortcut digit sequence in order to reach a desired destination. In a corporate PBX system, a private server may include a translation table that indicates (possibly on a per-user basis) what digit sequences particular abbreviated sequences stand for. When a user dials the abbreviated sequence, the server may translate it into the full digit sequence and send the full sequence into a carrier's network as though the user had dialed the full sequence.

Similarly, abbreviated dialing has been extended to use in AIN-capable networks. There, the system may comprise a Centrex arrangement. Basically, the Centrex arrangement provides PBX-like features by employing special service logic in a carrier's network, typically in a central control point (but possibly in the serving system itself). The central control point may define a subscriber profile for all employees of a corporation, or for another specified group of subscribers. The profile may point to service logic that provides the same types of features (e.g., call forwarding, call conferencing, abbreviated dialing, etc.) that a PBX system could provide, and possibly other features as well. When a user having Centrex service dials an abbreviated sequence, the serving system may encounter a trigger for the user and send the sequence to a central control point. The central control point may then translate the abbreviated sequence into a full sequence and return the full sequence to the serving system. The serving system would then set up and connect the call to the address indicated by the full sequence.

In addition, telecommunications carriers often define special abbreviated dialing sequences for use by all subscribers.

Such public abbreviated dialing sequences usually look like feature codes, with preceding asterisks for instance, so that subscribers will know that the codes have special meaning. Such carrier-wide abbreviated dialing codes are common in wireless systems. For instance, a wireless carrier may specify that the dialed digit sequence *123 corresponds to a request for traffic assistance. When a subscriber dials that sequence in the carrier's network, the serving system (with or without the guidance of a central control point) may then translate the sequence into a full routing label identifying the network address of a traffic assistance center, and the serving system may then route the call to that center.

One problem with today's feature code systems is that the codes usually have a set meaning, broadly defined for many subscribers. Feature codes are typically defined by a service carrier and publicized for use by all subscribers to the carrier's service. For instance, a carrier may define *67 to mean that calling-number identification information should be blocked for a subsequently-dialed digit sequence, and the carrier may define *70 to mean that call-waiting should be disabled for a subsequently-dialed digit sequence. If a subscriber wants to block calling-number identification or disable call-waiting for a particular call, the subscriber needs to remember to apply the corresponding feature codes.

Another problem with feature codes is that they are not standardized. A feature code string that controls the use of a feature in one carrier's network may not be identical to the code that controls the same feature in another carrier's network. This can be confusing for a subscriber who uses separate networks at various times, such as a subscriber who has home telephone service as well as mobile telephone service. Further, network operators are reluctant to change feature codes that have been in use for years, since the established codes have become familiar mechanisms for many subscribers.

SUMMARY OF THE INVENTION

The present invention provides a mechanism to go beyond current feature code applications and create customized profile management codes with special meanings to be assigned to a subscriber or group of subscribers. With the benefit of the present invention, a given profile management code may be given one meaning for a given subscriber and may be given an altogether different meaning to another subscriber. For example, a profile management code of "*11" or simply "11" may indicate for one subscriber that call-forwarding-unconditional should be activated for the subscriber, while the identical feature code may indicate for another subscriber that calling-number identification information should be blocked for a subsequently-dialed call. A central control point can receive a profile management code that is custom-defined for a particular subscriber, interpret the code, and then responsively perform an action that is designated to correspond to the code.

In accordance with a principal aspect, a central control point in a telecommunications network is arranged to receive a signaling message. The message may be provided by a serving system, by another central control point, or by another entity. The message includes members that identify a subscriber and indicate a customized profile management code provided by the subscriber. The subscriber may be a person (operating a telephone or other communications terminal, for instance) or a machine (such as a computer or other device). Upon receipt of the message, the central control point identifies a set of service logic associated with the subscriber. The set of service logic defines one or more customized profile management codes for the subscriber, rather than generally for all subscribers. In particular, the service logic indicates for the subscriber that a given profile management code (e.g., a digit sequence) corresponds to a designated action. The central control point then employs a set of service logic to carry out the designated action.

The designated action may take various forms but is preferably distinguished from the action of merely translating a dialed digit sequence into a routing number. By way of the example, the action may comprise modifying the service logic associated with the subscriber and/or activating or deactivating a service feature for the subscriber. For instance, if the service logic for the subscriber indicates that unanswered calls should be forwarded, the service logic may indicate specially for the subscriber that a particular profile management code constitutes a request to deactivate call-forwarding. As another example, the service logic may indicate specially for the subscriber that a particular profile management code constitutes a request to send a text message (e.g., as a short message service, to a mobile station or other message-receiving entity, for instance).

As still another example, the designated action may be sending a message to another entity, which causes the other entity to change the service logic for the subscriber or for another subscriber. The message could be an instruction to change service logic, could be a code calling for change of service logic, or could take any other desired form. For instance, a profile management code that is custom-defined for a particular subscriber might mean to a central control point that the central control point should generate and send to another central control point a standard feature code to carry out some predefined function. For example, although the standard feature code for activating voice mail in a given wireless network might be "*35", a central control point could be programmed specifically for a given subscriber to treat the code "22" from that subscriber as a request to activate the subscriber's voice mail. Upon receipt of that customized code from the subscriber, the central control point might then generate and send the standard feature code "*35" to the subscriber's HLR, instructing the HLR to activate the subscriber's voice mail. In this way, the subscriber could use the custom-defined string "22" to activate voice mail, without having to remember the standard feature code "*35". Of course, other examples are possible as well.

After the central control point executes the service logic to perform one or more designated actions in response to a customized profile management code for a subscriber, the central control point may generate and send a response signaling message to the serving system or other entity that provided the initial message. In an exemplary arrangement, a serving system or other entity may then be arranged to play a message to the subscriber indicating that the designated action has been taken in response to the customized code.

These as well as other aspects and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
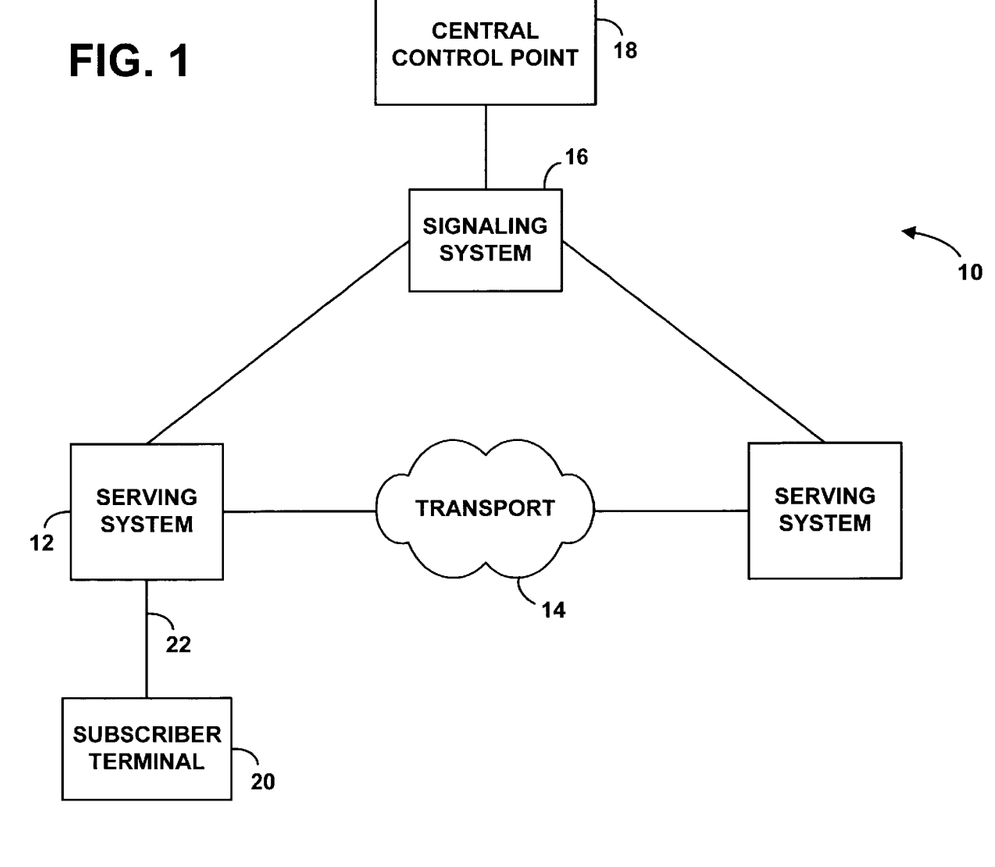
FIG. 1 is a simplified block diagram illustrating a telecommunications network comprising a serving system and a central control point.

Referring to the drawings, FIG. 1 illustrates a simplified block diagram of a telecommunications network 10 in which an exemplary embodiment of the present invention can be employed. As shown in FIG. 1, network 10 includes a serving system 12 interconnected to (or part of) a transport network 14 and to a signaling system 16, and at least one central control point ("CCP") 18 interconnected to the signaling system 16 as well. Network 10 further includes a plurality of subscriber terminals, of which exemplary terminal 20 is shown. Terminal 20 may take any suitable form, such as, for instance, a telephone, a computer, or a personal digital assistant ("PDA"). Terminal 20 may then be coupled to serving system 16 by an appropriate link 22, which may comprise wireline or wireless portions.

This and other arrangements described herein are shown for purposes of illustration only, and those skilled in the art will appreciate that other arrangements and other elements (e.g., machines, interfaces, functions, etc.) can be used instead, and some elements may be omitted altogether. Further, as in most telecommunications applications, those skilled in the art will appreciate that many of the elements described herein are functional entities that may be implemented as discrete components or in conjunction with other components, in any suitable combination and location. Still further, various functions described herein as being performed by one or more entities may be carried out by a processor executing an appropriate set of machine language instructions stored in memory. Provided with the present disclosure, those skilled in the art can readily prepare appropriate computer instructions to perform such functions.

As noted above, serving system 12 includes a set of stored logic that defines how to process calls involving one or more terminals, such as terminal 20. The stored logic may include a number of trigger points that cause the serving system to seek guidance from CCP 18 in response to various conditions. When serving system 12 encounters a trigger, the serving system may pause call processing and send a signaling message via signaling system 16 to CCP 18, carrying various parameters. For calls originating from terminal 20, the signaling message may, for instance, convey an identification of the terminal and the digit sequence dialed by the subscriber. For calls terminating to terminal 20, the signaling message may, for instance, convey an identification of the terminal and an indication of the calling party. Of course, these are only examples; the messages may convey these and/or other parameters.

As further noted, CCP 18 also includes a set of stored logic. When CCP 18 receives the signaling message from serving system 12, CCP 18 will execute its stored logic so as to parse the message, identify its parameters, and responsively carry out one or more functions. For example, in response to a call-origination signaling message, CCP 18 may determine that the subscriber dialed a toll-free number (e.g., an 800, 888 or 877 number). Conventionally, the CCP's logic may then cause the CCP to reference a database in order to translate the toll-free number into an actual routing number associated with the called party. The CCP may then generate and send to serving system 12 a response message instructing serving system 12 to route the call to the actual routing number. In turn, serving system 12 would then set up and connect the call over transport network 14 to that routing number.

Figure 2:
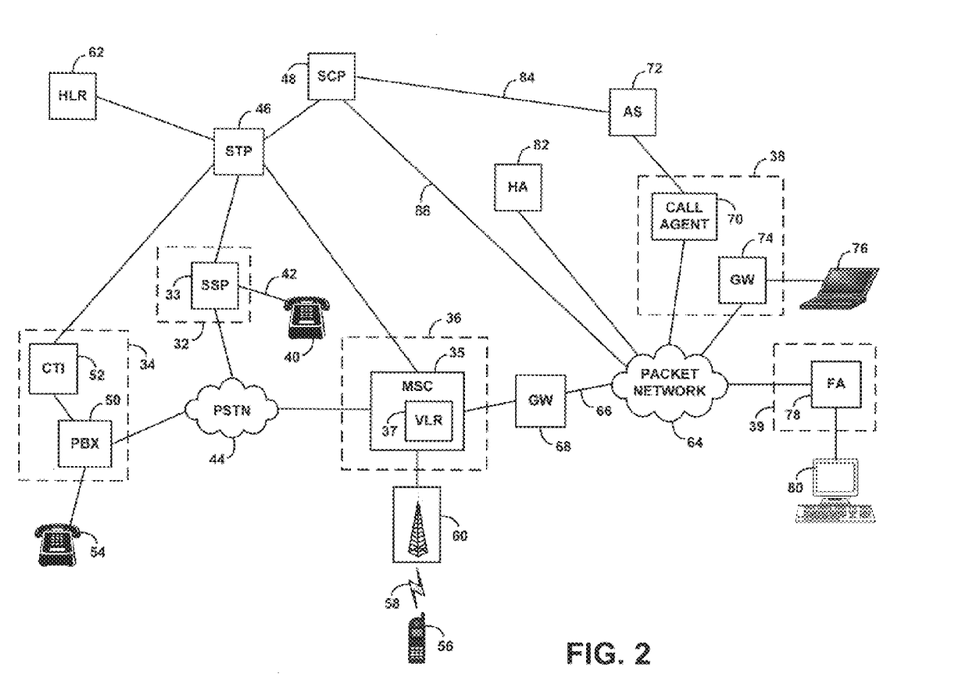
FIG. 2 is a block diagram illustrating a telecommunications network comprising a plurality of serving systems and central control points.

Network 10 is a generically representative of an AIN arrangement in which an exemplary embodiment of the present invention can be implemented. The particular arrangement, however, may take any of a variety of forms. To further illustrate arrangements in which the invention can be implemented, FIG. 2 depicts a network 30, which comprises at least five example serving systems, designated respectively by reference numerals 32, 34, 36, 38 and 39.

Example serving system 32 is principally a landline serving system, which typically comprises a landline switch (SSP) 33, such as a Nortel DMS-100 or DMS-250. Serving system 32 serves a plurality of landline subscriber stations, of which an exemplary station 40 is shown coupled by link 42 (typically a twisted copper pair of wires), and the SSP includes a set of logic indicating how to process calls involving those stations. Serving system 32 is coupled to a transport network such as the public switched telephone network ("PSTN") 44, and further to a signaling network represented by STP 46. In turn, signaling network is coupled to a central control point such as service control point (SCP) 48. SCP 48 includes a set of service logic to perform AIN functions for calls being served by system 32. When serving system encounters a predefined trigger point in its service logic, it pauses call processing and sends a signaling message via STP 46 to SCP 48. SCP 48 interprets the message and applies its own service logic, and SCP 48 then typically returns a response signaling message via STP 46 to serving system 32, instructing serving system 32 how to handle the call.

Example serving system 34 comprises a PBX server 50 coupled to a computer telephony interface ("CTI") 52. Such a serving system may serve a plurality of subscriber stations (e.g., corporate telephones or the like), an exemplary one of which is shown as station 54 for instance. The serving system (typically CTI 52) may maintain one or more subscriber profiles that define service parameters for the various stations being served. When the serving system receives a call to or from station 54, the CTI may then apply a set of logic based on the associated subscriber profile and, in doing so, may encounter a trigger point that causes the CTI to query SCP 48 for guidance. The CTI might then pause processing and send a signaling message via STP 46 to SCP 48, and the SCP might then apply its own service logic and send a response message to the CTI instructing system 34 how to handle the call.

Example serving system 36 is principally a wireless serving system, which typically comprises a mobile switching center (MSC) 35, such as a Lucent or Nortel MSC. Serving system 36 serves a plurality of wireless subscriber stations, of which an exemplary station 56 is shown coupled via an air interface 58 and base station 60. Serving system 36 further typically includes a visitor location register (VLR) 37, which maintains service logic (e.g., profiles) for wireless stations currently being served by system 36. Serving system 36 is also coupled via STP 46 to a home location register (HLR) 62, which, in this example, serves as the home register for wireless station 56. HLR 62 may perform AIN functions for calls being served by system 36. For instance, when serving system 36 receives a call for station 56 and station 56 is busy, serving system 36 may encounter a trigger and responsively pause processing and send a signaling message via STP 46 to HLR 62. HLR 62 would then interpret the message and apply its own service logic, and HLR 62 would then return a response signaling message via STP 46 to serving system 36, instructing serving system 36 how to handle the call. In addition, SCP 48 may perform AIN functions for serving system 36 in a similar fashion. Alternatively, the HLR and SCP might communicate with each other, to have one execute service logic based on parameters provided by the other.

Traditional landline and wireless communications networks have been based principally on a circuit-switched arrangement, in which a switch (e.g., SSP or MSC) sets up and reserves an actual circuit with a remote switch, maintaining the circuit for the duration of the call. Recognizing the inherent inefficiency of this arrangement, the telecommunications industry has begun to embrace various "next generation networks" instead. Such networks typically employ packet-switched communication links (in addition to or instead of circuit-switched links). A gateway or "network access server" typically receives a media stream (e.g., voice, video, etc.) and/or a pure data stream and encodes and packetizes the stream into a sequence of packets. Each packet bears a header identifying its source and destination address as well as other information. The packets may be routed independently from node to node through a network and then re-ordered and reassembled by a gateway at the destination end for output to a receiving entity (e.g., person or machine). Alternatively, the packets may follow an established "virtual circuit," each traversing the same path from node to node and ultimately to the destination gateway.

For purposes of illustration, example serving system 36 is shown coupled to two transport networks, PSTN 44 and a packet-switched network 64 (such as the Internet, for instance). Serving system 36 may be coupled to the packet network 64 by a link 66 that includes an "interworking function" (IWF) or gateway 68, which is arranged to convert between circuit-switched voice and/or data transmissions handled by system 36 and a packet sequence appropriate for transport over network 64 (e.g., as an ATM or Voice over IP transmission). (In practice, the IWF might hang off of a trunk of MSC 35.) In this way, serving system 36 can provide connectivity for wireless subscriber station 56 over both the PSTN and the packet-switched network.

As presently contemplated, next generation networks may employ AIN principles as well. For example, a network access server may communicate with a "call agent" node on the packet-switched network. The call agent node may serve as a gatekeeper, typically including connection manager, connection performer, and service management layers for routing calls through the packet network. (The call agent node may also be referred to as a "service manager," or "soft switch.") To take advantage of existing architecture, the service logic for providing AIN telecommunications services then typically resides on a separate "application server" also coupled with the packet-switched network or coupled directly with the call agent node. (The application server may itself be an SCP, for instance). The call agent and gateway may cooperatively be considered a type of "serving system" for a media stream and/or data stream being transmitted in a packet switched network, and the application server may be considered a type of central control point. As in traditional AIN arrangements, the serving system may then query the central control point, providing parameters such as the source and destination addresses, and the central control point can execute appropriate service logic and return call handling instructions. For instance, the application server may direct the serving system to redirect the packet stream to a "forwarding" address or other location.

As shown in FIG. 2, for instance, example serving system 38 comprises a call agent node 70 (e.g., a Telcordia Service Manager or a Lucent Softswitch), which is coupled to (or a node on) packet network 64. Call agent node 70 is in turn coupled to an application server ("AS") node 72, which may itself be an application residing on an SCP, HLR, CTI or similar entity. (For instance, as presently contemplated, AS 72 and SCP 48 may be provided as a common entity). Alternatively, both the call agent node and the application server node might be independent nodes on packet network 64. Serving system 38 may further comprise a gateway ("GW") or other such node (e.g., switch, hub, router, etc.), which may seek to route packets representing real-time media (e.g., voice, video, etc.) and/or data streams over the packet network. An example of such a gateway node is shown in FIG. 2 as gateway 74. Gateway 74 may provide subscriber stations with connectivity to the packet network. A representative station is shown as station 76.

Call agent node 70 may maintain a set of subscriber profile logic, including parameters such as trigger points, for subscribers such as station 76. When gateway 74 or another node seeks to route a packet sequence to or from station 76, the node may then communicate with call agent 70 (e.g., via a protocol such as MGCP, SGCP, SIP or H.323) to obtain call handling instructions. Call agent 70 may in turn encounter a trigger point in the subscriber profile and responsively communicate with AS 72 to obtain AIN service. In practice, call agent 70 may communicate with AS 72 according to an AIN 0.2-like protocol, over TCP/IP, or according to any other suitable protocol (e.g., SIP, H.323 or straight SS7). Thus, for instance, call agent 70 may generate and send to AS 72 a TCAP query message defining various parameters, and AS 72 may responsively employ an appropriate set of service logic and then generate and send to call agent 70 a TCAP response message. Call agent 70 may then instruct gateway 74 accordingly. In this arrangement, the CCP thus comprises AS 72. From another perspective, however, the CCP may be considered to include call agent 70, for instance, to the extent the call agent also provides AIN service logic to assist the gateway in handling call traffic.

Example serving system 39 illustrates another type of next generation, packet-switched network arrangement. This arrangement, known as "Mobile IP," has emerged to serve nomadic users (terminals) who connect to a wireline (or possibly wireless) network. Mobile IP ("MIP") attempts to solve a problem that arises when a mobile terminal with a permanent network address (e.g., internet protocol (IP) address) in one sub-network changes physical locations, such as moving to another sub-network. The arrangement works somewhat like a postal forwarding system. Each terminal is assigned a permanent address that is maintained by a "home agent," which might be a gateway or other entity in the terminal's home sub-network. When the terminal travels to another sub-network, the home agent will receive packets destined for the terminal. The home agent will then add a new header to the packets (or modify their existing headers) and forward them to a "foreign agent," which is a node serving the foreign sub-network. The foreign agent then de-capsulates the packets and forwards them to the mobile terminal.

As presently contemplated, AIN principles can be applied in a Mobile IP arrangement as well. In particular, the sub-network in which the mobile terminal is currently located could be considered a serving system, and the terminal's home sub-network could be considered the terminal's home system. Thus, as contemplated, a subscriber's home agent can be programmed to serve as a central control point, somewhat like an HLR or SCP in a wireless network, and the foreign agent can be programmed to employ subscriber profiles for visiting terminals, somewhat like the combined MSC/VLR entity in a wireless network.

In FIG. 2, example serving system 39 is thus shown to comprise a MIP foreign agent ("FA") 78. Typically, FA 78 might be a gateway node on packet network 64, arranged to convert between circuit-switched data and/or voice on one side and packet traffic appropriate for packet network 64 on the other side. However, FA 78 can take other forms. Then somewhat like serving system 36, system 39 would act as a serving system for nomadic stations (whether landline or wireless) that are visiting a given sub-network with which FA 78 is associated. One such station is depicted by way of example as station 80. In turn, packet network 64 is also coupled to (or includes) a home agent ("HA") 82, which, in this example, serves as the home agent for station 80. As such, HA 82 may play the part of an AIN central control point, maintaining a set of service logic and providing call handling instructions to serving system 39. The functionality of HA 82 may reside on an SCP or HLR, for instance.

As thus illustrated, each serving system in network 30 is typically served by one or more particular CCPs, which is usually (but not necessarily) owned and operated by the same carrier that operates the serving system. A CCP in one carrier's system, however, can be arranged to provide AIN functionality to serve subscribers operating in another carrier's system. Alternatively, a CCP in one carrier's system can be arranged to provide AIN functionality for another CCP in the same carrier's system. One way to accomplish this, for instance, is to have one set of CCP service logic communicate with another set of CCP service logic, in order to request and provide instructions on how to handle a given call. The two sets of service logic may reside on separate physical CCP entities or may reside on separate partitions of the same CCP entity (e.g., as landline and wireless segments of a given SCP), or may be in another arrangement. Thus, for instance, when one CCP receives a service request from a serving system, the CCP might responsively forward the request to another CCP, send instructions to another CCP, or seek guidance from another CCP.

As shown in FIG. 2, for instance, SCP 48 might be coupled by a communications link 84 (which could be a packet switched link, for instance) with AS 72. That way, when a serving system on packet network 64 seeks guidance from AS 72, AS 72 can in turn seek guidance from SCP 48. In response to instructions from SCP 48, AS 72 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

An exemplary embodiment of the invention will now be described with respect to the portion of network 30 comprising serving system 32 (comprising an SSP), representative subscriber station 40, and an SCP 48 coupled to the serving system through STP 46. It should be understood, however, that this example applies by analogy to any other network arrangement or combination of network arrangements, such as other portions of FIG. 2, for instance, or other arrangements not shown in FIG. 2. Thus, for example, where this description refers to SCP 48 as the central control point, other types of central control points, possibly with disparate physical and functional arrangements, could be substituted. Similarly, where the description refers to serving system 32 or subscriber station 40, other serving systems or subscribers could be substituted.

Figure 3:
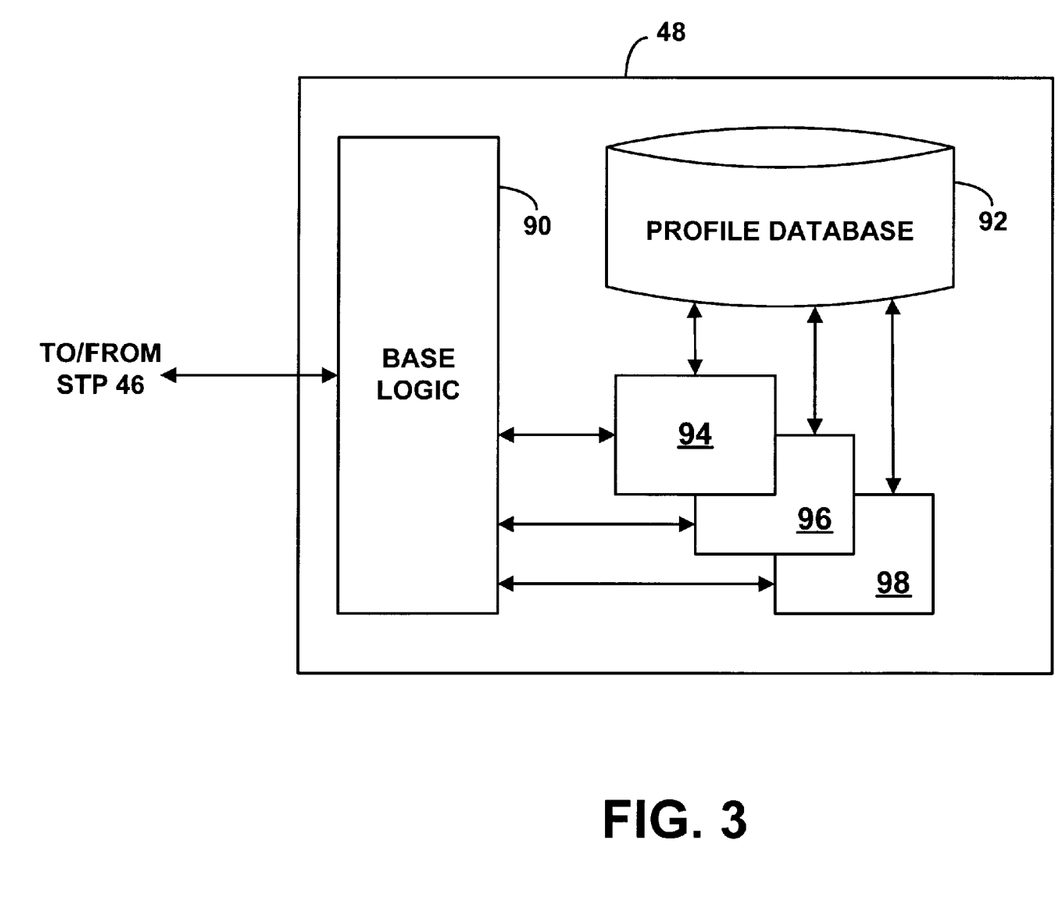
FIG. 3 is a block diagram illustrating a central control point in accordance with an exemplary embodiment of the present invention.

Referring to FIG. 3, there is shown a block diagram illustrating exemplary SCP 48 in greater detail. In FIG. 3, double-headed arrows indicate the most important logical connections between the components. SCP 48 may be a Telcordia SCP, which typically comprises a number of functional components and is therefore also referred to as an Integrated SCP or "ISCP."

SCP 48 includes a base service logic module 90, which defines functionality for decoding and encoding TCAP messages received from and sent to serving system 32 via STP 46. Base service logic module 90 also includes service logic for determining what databases and service logic modules to invoke in order to process the information from the decoded TCAP messages. For example, base service logic module 90 has access to a database 92 containing the service profiles of the serving system's subscribers. Each subscriber in the serving system typically has a service profile in database 92 that identifies (i) the subscriber by telephone number or by other indicia, (ii) what services the subscriber subscribes to, and (iii) what service logic module to run for each service.

The service profile may also include certain service parameters that the SCP can use to apply one or more of the customer's services and can thus be considered part of the service logic that the SCP will apply for the subscriber. For example, the service profile for customer John Doe might list his phone number as 765-4321 and indicate that he subscribes to a terminating call screening feature. The service parameters for this service may include the days and times the call screening is to be in effect, e.g., just evening hours. The service parameters may also indicate that, even when the call screening is in effect, calls from certain telephone numbers, e.g., close friends and relatives, can get through. As another example, if John Doe subscribed to an abbreviated dialing service, his service profile might specify that the sequence of dialed digits "1234" stands for the telephone number 987-567-1234.

Figure 4:
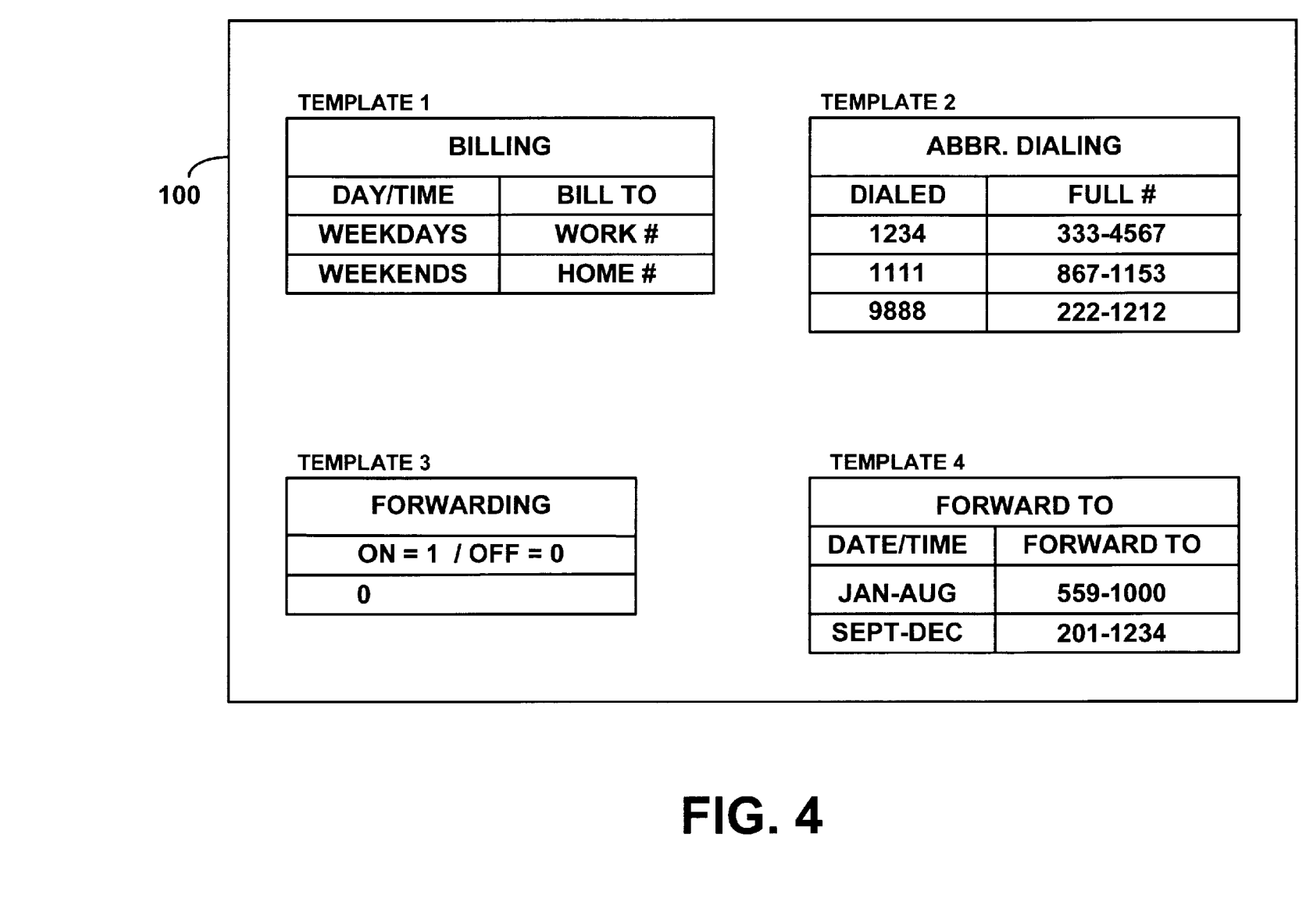
FIG. 4 is an illustration of portions of a typical subscriber profile maintained by the central control point of FIG. 3.

FIG. 4 illustrates some of the parameters of an exemplary service profile 100 for subscriber station 40, which may be maintained in database 92, for instance. As shown in FIG. 4, profile 100 includes a number of templates (represented as data tables) that define various service parameters for subscriber 40. Example template 1 is a billing template, which indicates account numbers to which calls from subscriber 40 should be billed, depending on the date/time. For instance, line a of the template indicates that on weekdays calls should be billed to a specified work number (e.g., the subscriber's employer), and line b of the template indicates that on weekends calls should be billed to a specified home number (e.g., the subscriber's home).

Example template 2 is an abbreviated dialing template, which indicates full NPA-NXX numbers corresponding to abbreviated dialing extensions for the subscriber. For instance, line a of the template correlates extension "1234" with full number "333-4567," and line b of the template correlates extension "1111" with full number "867-1153." Example template 3 is a call-forwarding template, which indicates whether or not the call-forwarding function is currently active for the subscriber. A value of 0 in line a of the template indicates that call forwarding is off for the subscriber, while a value of 1 in line a of the template indicates that call forwarding is on for the subscriber. Finally, example template 4 is a forward-to template, which indicates forward-to numbers for the subscriber depending on the current date/time. For instance, line a of the template indicates that calls should be forwarded to "559-1000" from January through August, and line b of the template indicates that calls should be forwarded to "201-1234" from September through December.

Typically, associated with each AIN service is a service logic module, which is the software specifying how to provide the service. Shown in SCP are the service logic modules 94–98 for three representative AIN services. Although three service logic modules are shown in FIG. 3 for purposes of illustration, it is to be understood that SCP 48 can include a greater or lesser number. To provide a given AIN service, base service logic module 90 typically invokes the appropriate one of modules 94–98 as a kind of subroutine call. In particular, base service logic module 90 passes a set of input parameters to the service logic module, and the module returns a set of output parameters out of which base service logic module 90 can encode the TCAP message or messages needed to provide the desired service or with which the base service logic module can perform other functions. For example, if service logic module 84 defines an abbreviated dialing service, it would typically compare the digits dialed by the subscriber with the dialed digits defined in the subscriber's profile. If a match occurs, the logic module would then convert the dialed digits into a corresponding full number indicated by the subscriber profile. As shown in FIG. 3, service logic modules 94–98 are typically able to query database 92 directly, and, although it is not shown in FIG. 3, it is possible for service logic modules 94–98 to invoke each other.

SCP 48 may of course take other forms. As an example, for a given subscriber or group of subscribers, the SCP may maintain a distinct set of call processing logic, which the SCP may employ for calls involving that subscriber or group, rather than (or in addition to) employing a base logic module 90 or special service modules 94–98.

In operation, when serving system 32 receives a request to connect a call to or from subscriber 40, serving system 32 will apply its own minimal set of service logic for the subscriber, which will typically include a number of trigger points. When serving system 32 encounters such a trigger, it will generate and send to SCP 48 a TCAP message, defining parameters about the call request. When SCP 48 receives the TCAP message from serving system 32, base logic 90 parses the message to identify the parameters and stores various parameters of the message in memory. The base logic then reads the subscriber profile in database 92 to determine what services the subscriber subscribes to and loads data templates from the subscriber profile into memory as well. For instance, on call origination from subscriber 40, the base logic may load the data of templates 1 and 2 (shown in FIG. 4) into memory. For each service defined by the subscriber profile, the base service logic may then apply the appropriate service logic module.

For instance, on call origination from subscriber 40, the base logic may first call service logic module 94, which may comprise billing-number logic. Service logic module 94 may then compare the current date/time with the date/time parameters specified in the subscriber's billing template. If the date/time is a weekday, module 94 may return to base logic 90 an indication that the call should be billed to the subscriber's specified work number, while if the date/time is a weekend, module 94 may return to base logic 90 an indication that the call should be billed to the subscriber's specified home number.

Next, for instance, the base logic may call logic module 96, which may comprise abbreviated dialing logic. Service logic module 96 may compare the dialed digit sequence with the abbreviated dialing extensions specified in the subscriber's abbreviated dialing template. If the dialed digits are "1234," module 96 may return to base logic 90 an indication that the dialed digits are converted to "333-4567," while if the dialed digits are "1111," module 96 may return to base logic 90 an indication that the dialed digits are converted to "867-1153."

As shown in FIG. 2, for instance, SCP 48 might be coupled by a communications link 84 (which could be a packet switched link, for instance) with AS 72. That way, when a serving system on packet network 64 seeks guidance from AS 72, AS 72 can in turn seek guidance from SCP 48. In response to instructions from SCP 48, AS 72 can then pass a signaling message back to the querying serving system, instructing the system how to handle the call. Advantageously, then, a user engaging in communications over a next generation packet switched network can benefit from service logic maintained in another network, such as the user's home telephone network. For instance, the services and features that are applied to the user's home telephone can be applied as well to communications over the next generation network. The same thing can be said for other combinations of networks as well, such as mobile and landline, for instance.

Figure 5:
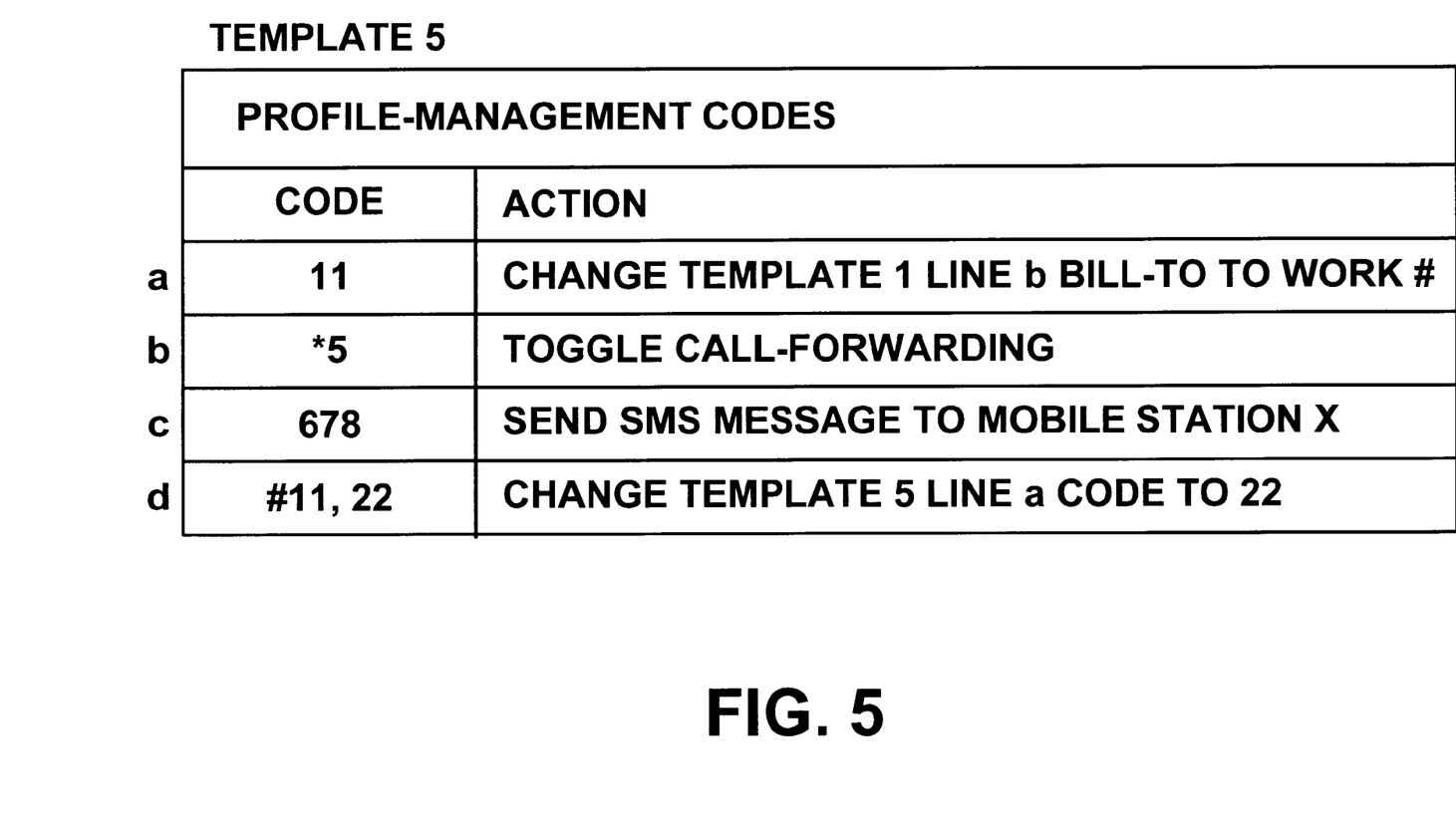
FIG. 5 is an illustration of another portion of a subscriber profile maintained by the central control point of FIG. 3, in accordance with an exemplary embodiment of the present invention.

In accordance with an exemplary embodiment of the present invention, the service logic that SCP 48 employs for a given subscriber can define one or more customized-profile-management-code parameters, indicating specifically for the subscriber what the SCP should do in response to particular profile management codes dialed by the subscriber. For instance, a subscriber profile can include a profile-management-code template, which defines customized profile management codes for the subscriber and correlates an SCP action with each code. For purposes of illustration, an example profile-management-code template (template 5) for subscriber 40 is illustrated in FIG. 5. Example template 5 defines actions for several profile management codes, such as "11", "*5", "678" and "#11, 22". These codes and action definitions are not intended to be limiting, but are intended to illustrate some of many possible actions that can be indicated by customized profile management codes in accordance with the present invention.

Referring to FIG. 5, the example profile-management-code template indicates that the dialed digit sequence "11" means the SCP should change the subscriber's weekend bill-to number to be the subscriber's specified work number. The example template next indicates that the dialed digit sequence "*5" means the SCP should toggle line a of the caller's call-forwarding template between 0 and 1 (i.e., between call-forwarding on and off). The example template next indicates that the dialed digit sequence "678" means the SCP should send a short text message to a designated mobile station. Finally, the example template indicates that the dialed digit sequence "#11, 22" means the SCP should change the feature code "11" for the subscriber to be "22" instead (i.e., the SCP should change the feature code listed in line a of template 5 to be "22.")

As one of many possible alternatives, rather than defining the specific SCP actions in the subscriber profile (e.g., template 5), the subscriber profile may correlate specified profile management codes with canned action items, which might be defined elsewhere in the SCP's service logic or in other logic. For instance, one of the SCP service logic modules 94–98 might include a table that defines "Action X" to mean "toggle on/off call forwarding" and "Action Y" to mean "for a feature code taking the form '#C, N', change profile management code C to new profile management code N." The action listed in line b of template 5 might then be "Action X", and the action listed in line d of template 5 might then be "Action Y."

As noted above, the action definition for a profile management code provided in service logic for a given subscriber can take various forms. For instance, the action can involve activating, deactivating or otherwise modifying a service for the subscriber. It can also involve adding a new service previously not available to the subscriber, or taking away a service previously available to the subscriber. For example, the action could involve adding to profile 100 shown in FIG. 4 additional data templates such as templates to send predefined short messages or SMTP messages (e.g., e-mail) or activating or deactivating such service features.

Further, the action taken in response to a profile management code provided by a given subscriber can be made to impact a service feature for another subscriber. For instance, the service logic for an employer may include a customized profile management code definition that indicates that when the employer provided the profile management code, the service logic for a given employee should be changed to cause the SCP to maintain a record of all calls made by the employee.

As another example, a profile management code provided by a subscriber in a first sub-network could be made to impact a service feature in a second sub-network. For instance, a subscriber at a mobile station could send a customized profile management code that causes a service logic change for the subscriber's landline telephone or for another subscriber's mobile IP terminal. This can be accomplished, for instance, by having a central control point in the first sub-network forward the profile management code or corresponding action instructions to a central control point, serving system or other entity in the second sub-network, or through other arrangements.

As a particular example, for instance, assume that a subscriber's HLR requires the subscriber to dial the feature code "*35" in order to turn on voice mail service, but assume further that the subscriber's birthday is 11/29 and that, rather than having to dial *35, the subscriber wants to be able to use the memorable string "1129" as his code to turn on voice mail. To do so, the service logic for the subscriber in SCP 48 may be arranged to custom-define the profile management code "1129" to mean that the subscriber wants to turn on voice mail, and the subscriber's serving system profile may be set up with a trigger (e.g., an all-digits trigger) that points to the SCP. When the subscriber dials the customized code 1129, the serving system would thus encounter the trigger and send the dialed digits to the SCP. Upon encountering the custom-definition for the subscriber, the SCP might then generate and send to the subscriber's HLR the feature code "*35", so as to direct the HLR to turn on the subscriber's voice mail. The SCP may convey this feature code, for instance, through use of a standard IS-41C "FeatureRequest" message to the HLR. Consequently, with the benefit of the present invention, the subscriber in this example can readily turn on voice mail service by dialing the subscriber's birth date as a customized profile management code, rather than dialing the standardized feature code "*35".

In still another possible arrangement, the SCP profile-management-code logic for a subscriber can be arranged in a hierarchical structure. In this arrangement, for instance, if the subscriber provides a profile management code that is not defined by service logic at the SCP, the SCP logic for the subscriber might cause the SCP to query another entity in the network to determine the meaning of the code. This other entity can take any form, including but not limited to a PBX/CTI, an application server, a call agent, an HLR, an SCP, or generally a database system or other application that resides on a computer or other storage medium in the network. The other entity may then provide the querying service logic with an action definition corresponding to the profile management code for the subscriber. Alternatively, the other entity itself may responsively perform a designated action. Still alternatively, rather than employing a hierarchical structure, a given subscriber's logic may correlate particular profile management codes with actions that are defined by other entities.

As presently contemplated, the process of a subscriber providing a customized profile management code can also take various forms. First, as noted above, the subscriber can be a person or a machine. Second, the subscriber may dial a profile management code, speak a profile management code, or convey a profile management code in any other desired fashion. In the case of a spoken code, for instance, a voice activated services ("VAS") platform can receive the spoken code, convert it into an appropriate machine-readable form, and then forward it for receipt by the central control point. Still further, the customized profile management code does not necessarily need to be provided as a dialed number at the initiation of a call. As a possible alternative, for instance, the profile management code could be provided mid-call. Some switching protocols are currently capable of receiving and responding to mid-call feature codes, and this technology can be applied in the context of the present invention; others may become capable of doing so in the future.

Figure 6:
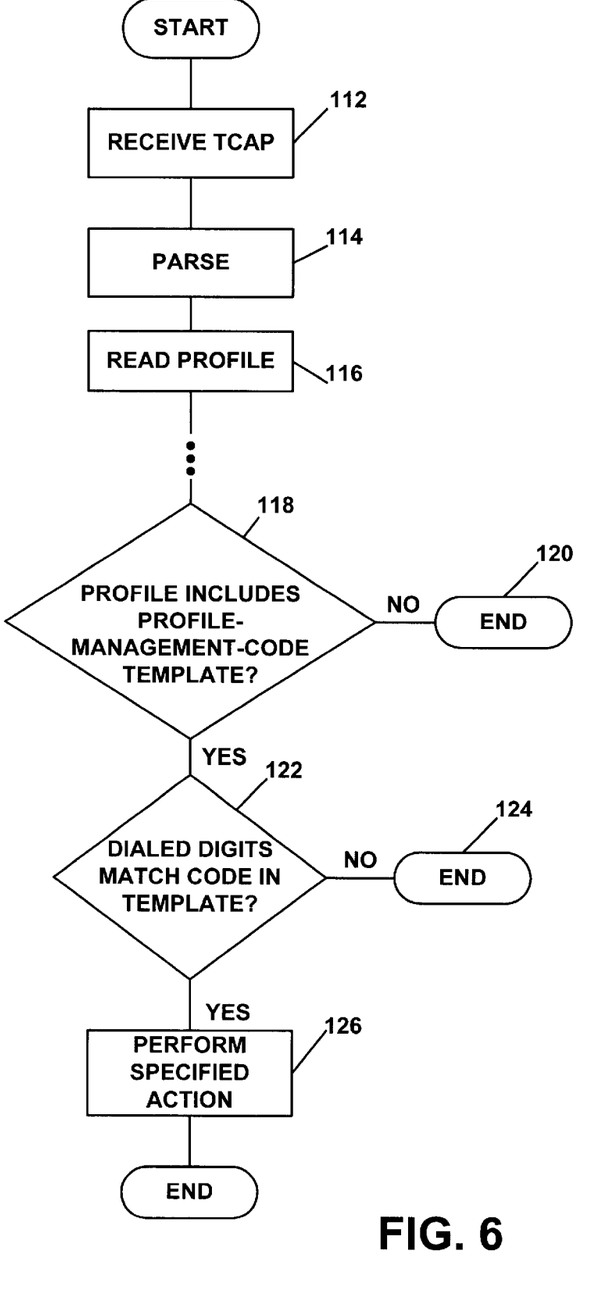
FIG. 6 is a flow chart illustrating operation of an exemplary embodiment of the present invention.

Referring next to FIG. 6, there is provided a flow chart 110 illustrating operation of an SCP in accordance with an exemplary embodiment of the present invention. The flow chart depicts how SCP 48 might perform customized-profile-management-code processing in an exemplary arrangement, employing the profile-management-code template of FIG. 5 for subscriber 40. It should be understood of course that the SCP may perform other steps aside from those shown in this flow chart, and that some steps shown may be combined with other steps, eliminated, or performed in another order, as desired.

As shown in FIG. 6, at block 112, SCP 48 receives a TCAP message from serving system 32, in response to a call origination attempt from subscriber station 40. The TCAP message identifies the subscriber, the digit sequence dialed (or otherwise provided) by the subscriber, and other information. In this example, assume that the subscriber dialed the digit sequence "*5". When the SCP receives the TCAP message, at block 114, it parses the message and stores in memory various parameters such as the subscriber ID and the dialed digit sequence. At block 116, SCP 48 then reads the service profile for subscriber 40 from database 92. In this example, assume the service profile comprises the templates shown in FIGS. 4 and 5.

Provided with the subscriber profile, SCP 48 then executes a set of service logic for the subscriber, including logic associated with various data templates defined by the profile. Thus, as described above, SCP 48 may apply billing logic, and abbreviated-dialing logic for instance. At block 118, the SCP determines whether the subscriber profile includes or references a profile-management-code template or other such data indicative of customized-profile-management-code definitions for the subscriber. If the profile does not include or reference any profile-management-code definitions, then, at block 120, the processing in this example may end (and the SCP may continue to perform other functions). On the other hand, if the profile does include or reference profile-management-code definitions, then, at block 122, the SCP compares the dialed digit sequence with the customized-profile-management-code strings defined by the subscriber profile. If the dialed digits do not match any of the custom-defined profile management codes, then, at block 124, processing may end as above. However, if the dialed digits match one of the custom-defined profile management codes, then, at block 126, the SCP performs a corresponding action defined or referenced by the profile.

In addition to the customized profile management codes defined specifically for a subscriber or group in accordance with the present invention, the SCP may still maintain a set of service logic defining feature codes available for use by subscribers generally. For instance, service logic module 98 may include logic that indicates the dialed digit sequence "*123" means that the SCP should instruct the serving system to route the call to the nearest travel assistance center (using location-based techniques). Any subscriber served by the SCP who provides those dialed digits will consequently be connected to the travel assistance center. As presently contemplated, however, subscriber service logic can override a generally-defined feature-code such as this by correlating a different action with the dialed digits. For instance, a subscriber profile may include data or a set of machine language instructions that correlates the dialed digits "*123" with the action "toggle voice-mail on/off" or with another action.

In accordance with an exemplary embodiment of the invention, the service logic that the central control point executes in order to carry out profile-management-code based service management can be provisioned in various ways. Continuing with the above example, for instance, SCP 48 can be provided with a service management system ("SMS") and/or graphical user interface sometimes referred to as a service creation environment ("SCE"), to allow for the provision and modification of the information and service logic residing in the SCP. In this way, a user at the terminal is able to access, create, and modify the service logic and other information in the SCP. The user may be a customer service agent of a telecommunications carrier, or the subscriber, or any other entity.

In another arrangement, a service provisioning terminal could be provided at or as part of customer premises equipment (e.g., the subscriber terminal or other entity) and could be arranged to send service logic provisioning data to the SCP over a direct link or a network link (such as the Internet with or without a Worldwide Web graphical interface). Referring again to FIG. 2, for instance, with an appropriate arrangement, the computer terminal designated by reference numeral 80 could be used to provision service logic in SCP 48 for subscriber station 40. In an exemplary arrangement, for example, SCP 48 could be coupled to (or a node on) packet network 64 by link 88. A user at terminal 80 could then input a set of provisioning data (such as data for inclusion in a profile-management-code template on SCP 48 for instance), and the computer could transmit the data via FA 78 and packet network 64 to SCP 48. SCP 48 may require such provisioning data to be provided in a particular format or protocol. An intermediate network node may therefore be provided to convert the provisioning data from terminal 80 into a form suitable for input to SCP 48. The intermediate network node might be an SMS, or could be another entity. Still alternatively, terminal 80 could itself provide the data in the requisite form, possibly converting raw data into a protocol suitable for loading into the SCP.

As still another example, enhanced subscriber services such as customized-profile-management-code logic can be provisioned into a central control point or other entity through an Internet connection via a subscriber station arranged as a Wireless Access Protocol ("WAP") client with respect to a WAP server on the Internet. As an example, then, the WAP server may provide for display at the subscriber station a form that the subscriber can fill in, in order to provide various service provisioning data (e.g., desired profile-management-code logic, or other desired logic). The WAP server, the subscriber station, or another entity in the network may then convert the provisioning data into a format suitable for loading onto and application by a central control point for instance, and the formatted data can be loaded onto the central control point, to be subsequently applied for the subscriber. In this way, a subscriber at a WAP-enabled station can provision telecommunications services for the WAP-enabled station or for another subscriber.

As yet another example, service provisioning over the Internet may make use of increasingly well known voice-based browsing techniques such as VXML ("Voice eXtensible Markup Language"). Thus, for instance, a person at a mobile station, landline station or other Internet terminal can provision enhanced service logic for the mobile station or for another terminal or subscriber by speaking to a VXML server. The server would then convert the spoken words into provisioning data, the server or another entity would translate the data into a format suitable for loading onto and application by a central control point, and the formatted data can be loaded onto the central control point, to be subsequently applied for a subscriber.

Still further, as described in an example above, customized profile management codes can be provisioned through the use of customized profile management codes or, alternatively, through use of basic feature codes. For instance, the example above indicates how a customized profile management code might allow a subscriber to change the digit sequence that defines a profile management code for the subscriber by inputting a defined digit sequence (such as "#C, N" to change profile-management-code string "C" to "N".) Similar arrangements might be implemented to allow a subscriber to change the action associated with a given profile management code.

An exemplary embodiment of the present invention has been illustrated and described. It will be understood, however, that changes and modifications may be made to the invention as described without deviating from the spirit and scope of the invention, as defined by the following claims.

We claim:

1. In a telecommunications network of the type comprising a serving system and a central control point with service logic defining service parameters for one or more subscribers, a method comprising:

the central control point receiving a signaling message, the signaling message including a first member indicative of a subscriber and a second member indicative of a subscriber-specific profile management code provided by the subscriber;

the central control point identifying a set of service logic associated with the subscriber, the set of service logic defining for the subscriber an action associated with the subscriber-specific profile management code; and the central control point executing the set of service logic to carry out the action.

2. A method as claimed in claim 1, wherein the central control point receives the signaling message from the serving system.

3. A method as claimed in claim 1, wherein the central control point receives the signaling message from another central control point.

4. A method as claimed in claim 1, wherein the action comprises modifying the service logic associated with the subscriber.

5. A method as claimed in claim 1, wherein the action comprises activating a service feature for the subscriber.

6. A method as claimed in claim 1, wherein the action comprises deactivating a service feature for the subscriber.

7. A method as claimed in claim 1, wherein the action comprises sending a message.

8. A method as claimed in claim 7, wherein the message comprises an SMTP message.

9. A method as claimed in claim 7, wherein sending a message comprises sending a message from a first sub-network into a second sub-network.

10. A method as claimed in claim 1, wherein the action is other than translating a dialed digit sequence into a routing number.

11. A method as claimed in claim 1, wherein identifying a set of service logic associated with the subscriber comprises querying another network entity to determine the action associated with the profile management code.

12. A method as claimed in claim 1, further comprising the subscriber providing the profile management code in a first sub-network, wherein the action impacts service logic in a second sub-network.

13. A method as claimed in claim 12, wherein the subscriber comprises a mobile station and the action comprises modifying, activating or deactivating a service feature for a landline station.

14. A method as claimed in claim 1, wherein the profile management code is provided by the subscriber mid-call.

15. In a telecommunications network of the type comprising a serving system arranged to route call data, a central control point comprising:

a first module arranged to receive a signaling message, the signaling message including a first member indicative of a subscriber and a second member indicative of a subscriber-specific profile management code provided by the subscriber;

a second module arranged to identify a set of service logic associated with the subscriber, the service logic defining for the subscriber an action corresponding to the subscriber-specific profile management code; and a third module arranged to execute the set of service logic and to thereby carry out the action.

16. A central control point as claimed in claim 15, wherein the first module is arranged to receive the signaling message from the serving system.

17. A central control point as claimed in claim 15, wherein the first module is arranged to receive the signaling message from another central control point.

18. A central control point as claimed in claim 15, wherein the action comprises modifying the service logic associated with the subscriber.

19. A central control point as claimed in claim 15, wherein the action comprises activating a service feature for the subscriber.

20. A central control point as claimed in claim 15, wherein the action comprises deactivating a service feature for the subscriber.

21. A central control point as claimed in claim 15, wherein the action comprises sending a message.

22. A central control point as claimed in claim 21, wherein the message comprises an SMTP message.

23. A central control point as claimed in claim 21, wherein sending a message comprises sending a message from a first sub-network into a second sub-network.

24. A central control point as claimed in claim 15, where the action is other than translating a dialed digit sequence into a routing number.

25. A central control point as claimed in claim 15, wherein the second module is arranged to query another network entity to determine the action associated with the profile management code.

26. A central control point as claimed in claim 15, wherein the subscriber provided the profile management code in a first sub-network, and the action impacts service logic in a second sub-network.

27. A central control point as claimed in claim 26, wherein the subscriber comprises a mobile station and the action comprises modifying, activating or deactivating a service feature for a landline station.

28. A central control point as claimed in claim 15, wherein the profile management code is provided by the subscriber mid-call.

29. A logic module stored in a central control point in an advanced intelligent network, the logic module defining, specifically for a given subscriber of telecommunications service, one or more suscriber-specific profile-management-code parameters indicating, specifically for the given subscriber, what the central control point should do in response to one or more suscriber-specific particular profile management codes provided by the subscriber.

30. In a telecommunications network of the type comprising a serving system and a central control point with service logic defining service parameters for one or more subscribers, a method comprising:

the central control point receiving a signaling message, the signaling message including a first member indicative of a subscriber and a second member indicative of a subscriber-specific profile management code provided by the subscriber;

the central control point identifying a set of service logic associated with the subscriber, the set of service logic defining for the subscriber an action associated with the subscriber-specific profile management code; and carrying out the action.

31. In a telecommunications network of the type comprising a serving system arranged to route call data, a central control point comprising:

a first module arranged to receive a signaling message, the signaling message including a first member indicative of a subscriber and a second member indicative of a subscriber-specific profile management code provided by the subscriber;

a second module arranged to identify a set of service logic associated with the subscriber, the service logic defining for the subscriber an action corresponding to the subscriber-specific profile management code; and a third module arranged to carry out the action.

* * * * *